(No Model.)
T. L. WILLSON.
PRODUCT EXISTING IN FORM OF CRYSTALLINE CALCIUM CARBIDE.
No. 541,138. Patented June 18, 1895.
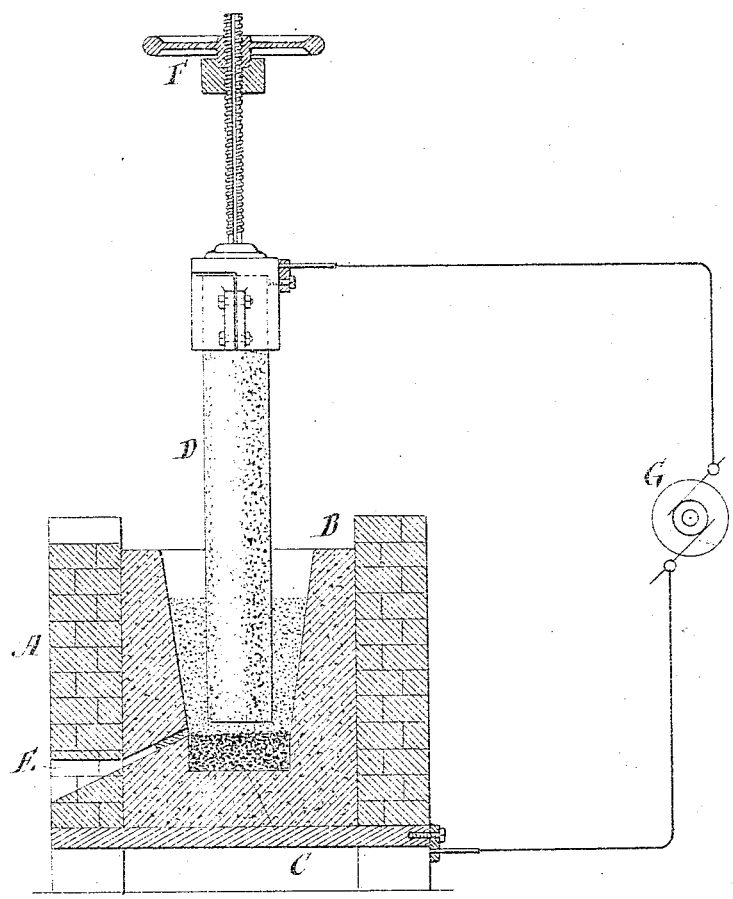

UNITED STATES PATENT OFFICE.

THOMAS L. WILLSON, OF NEW YORK, N. Y.

PRODUCT EXISTING IN FORM OF CRYSTALLINE CALCIUM CARBIDE.

SPECIFICATION forming part of Letters Patent No. 541,138, dated June 18, 1895.

Application filed March 4, 1895. Serial No. 540,456. (No specimens.)

*To all whom it may concern:*

Be it known that I, THOMAS L. WILLSON, of the city, county, and State of New York, have invented a new and useful Product Existing in the Form of Crystalline Calcium Carbide, of which the following is a full, true, and exact description, reference being had to the accompanying drawing.

This invention relates to the production of a new form of crystalline calcium carbide.

Before my invention calcium carbide has existed in an amorphous condition, due either to the method of its preparation, or to the impurities contained in it.

By my invention herein described, calcium carbide is produced in a new form, namely, in crystalline condition, having a bluish or purplish iridescence. The carbide so existing is in a condition particularly applicable, on account of its purity, for conversion into other compounds.

In order to produce this product, I proceed as follows: I take very finely divided coke and lime, mechanically reduced to a pulverulent condition, and I mingle them thoroughly mechanically in the proportion of thirty-five per cent. of coke and sixty-five per cent. of lime. I then subject them to the action of the electric current in a furnace, such as that shown in the accompanying drawing, which is a vertical section, and in which—

A represents an inclosing brick work; B, an internal lining, preferably of carbon, which, though preferable, is not in all cases necessary; C, one of the conducting poles, by preference of broken carbon; D, a removable pole of compacted carbon; E, a tap hole for removing the melted product, if desired; F, adjusting mechanism for raising the carbon pole D, and G an alternating current dynamo, which may, therefore, be made commutatorless.

In starting this furnace, the carbon pole D and the conducting bodies C are connected to the poles of an alternating current dynamo having a mean potential, say of fifty-five volts, and sufficient amperage to produce the amount of material required, having regard to the size of the furnace. Using, for instance, a pole having eight inches on the side, an amperage of about fifteen hundred is desirable. Under these conditions, by reason of the alternation of the current, a feeding in of the mingled lime and carbon between the poles is effected to an extent which does not occur when a direct current is used. Furthermore, it has been generally understood that the production of calcium carbide was due to an electrolytic action and not due to a smelting action. I have demonstrated that the action is purely a smelting action, under the conditions of the process here described. Furthermore, that the block of molten calcium carbide which forms beneath the elevating pole is itself a good conductor of electricity and can be built up from the bottom to any desired height without preventing the operation of the process. A height, for instance, of two or more feet is entirely practicable in the apparatus above described. If preferred, of course the fused calcium carbide may be tapped out as the same is formed, in the ordinary way, as applied to iron and steel. The liquid calcium carbide thus produced, when allowed to cool, crystallizes into the form above described, and when broken exhibits the iridescent surfaces above named. By this process, likewise, the yield of calcium carbide per electric horse power is almost doubled over a process of using a direct current, which is, evidently, a matter of the utmost importance, while, at the same time, the process proceeds uniformly and without break, by reason of the substantial uniform feeding in of the material.

It is essential, in order to produce the new material here described, to have the lime and coke very finely divided. This is done by a powdering machine, and then the powdered lime and coke are thoroughly mingled by a grinder or mixer so as to bring these bodies into most intimate contact. The action of the alternating current is likewise essentially different from that of a direct current, producing a series of explosions, the effect of which seems to be to feed the pulverized material into the arc. This is very important in accomplishing a rapid and uniform conversion.

What I claim as my invention, and desire to secure by Letters Patent, is—

As a new product, crystalline calcium carbide existing as masses of aggregated crystals, substantially as described.

In testimony whereof I have signed my name to this specification in the presence of two subscribing witnesses.

THOMAS L. WILLSON.

Witnesses:
H. COUTANT,
ANTHONY GREF.